US008102870B2

(12) United States Patent
Guo et al.

(10) Patent No.: US 8,102,870 B2
(45) Date of Patent: Jan. 24, 2012

(54) SYSTEM, SERVER AND METHOD FOR OPTIMIZING A GROUP MANAGEMENT PROTOCOL

(75) Inventors: Feng Guo, Shenzhen (CN); Singh Krishnaraj Rathore, Shenzhen (CN); Haiyang Su, Shenzhen (CN); Xiaoniu Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 12/277,050

(22) Filed: Nov. 24, 2008

(65) Prior Publication Data

US 2009/0219933 A1    Sep. 3, 2009

Related U.S. Application Data

(63) Continuation of application No. PCT/CN2006/003289, filed on Dec. 5, 2006.

(30) Foreign Application Priority Data

May 26, 2006    (CN) .......................... 2006 1 0080979

(51) Int. Cl.
*H04J 3/26* (2006.01)
(52) U.S. Cl. ..................................... 370/432
(58) Field of Classification Search .......... 370/390, 370/389, 392, 401, 400, 432, 471; 709/223, 709/227, 229, 230, 238, 239, 226
See application file for complete search history.

(56) References Cited

U.S. PATENT DOCUMENTS

2010/0040056 A1* 2/2010 Kobayashi .................. 370/390

FOREIGN PATENT DOCUMENTS

WO    WO 2006/053027 A2    5/2006

OTHER PUBLICATIONS

Asaeda et al., "MLDv2 Protocol Design, Implementation and Evaluation for Source-Specific Multicast Over IPv6," *Proceeding of the 2003 Symposium on Applications and the Internet Workshops*, 244-249 (Jan. 2003).
Cain et al., "Internet Group Management Protocol, Version 3," *Internet Engineering Task Force*, IETF Standard: Request for Comments 3376, 1-53 (Oct. 2002).

(Continued)

*Primary Examiner* — Man Phan
*Assistant Examiner* — Nourali Mansoury
(74) *Attorney, Agent, or Firm* — Leydig, Voit & Mayer, Ltd.

(57) ABSTRACT

The present invention discloses a method, server and system for optimizing a group management protocol so as to reduce the complexity in setting and switching filter modes in the prior protocols. The method includes: a group member sends a membership report to a multicast router; upon reception of the membership report, the multicast router judges whether the report carries an EXCLUDE mode non-empty source list; if so, the router updates a corresponding state inside the router according to a non-source-specific join; or else, the router updates the corresponding state inside the router directly with the information of the report. The method provided by the present invention can avoid the complex switching and processing of filter modes in the prior protocols.

11 Claims, 1 Drawing Sheet

OTHER PUBLICATIONS

Haberman et al., "IGMPv3/MLDv2 and Multicast Routing Protocol Interaction," *Internet Engineering Task Force*, IETF Standard Working Internet Draft, 1-6 (Jan. 2003) http://draft-ieff-magma-igmpv-and-routing-04.txt.

Li et al., "Analysis of IGMPv3," *Computer & Digital Engineering*, 3(2): 24-27 (Feb. 28, 2005).

State Intellectual Property Office of the People's Republic of China, Examination Report in Chinese Patent Application No. 2006100809793 (Mar. 13, 2009).

State Intellectual Property Office of the People's Republic of China, English Translation of Written Opinion of the International Searching Authority in International Patent Application No. PCT/CN2006/003289 (Mar. 15, 2007).

Deering et al., "Host Extension for IP Multicasting," Network Working Group, Request for Comments: 1112, rfc1112.txt (Aug. 1989).

Fenner et al., "Internet Group Management Protocol, Version 2," Network Working Group, Request for Comments: 2236, Updates: 1112, rfc2236.txt (Nov. 1997).

Vida et al., "Multicast Listener Discovery Version 2 (MLDv2) for IPv6," Network Working Group, Request for Comments: 3810, Updates: 2710, rfc3810.txt (Jun. 2004).

$2^{nd}$ Office Action in corresponding European Application No. 06828243.3 (Jul. 23, 2010).

* cited by examiner

SYSTEM, SERVER AND METHOD FOR OPTIMIZING A GROUP MANAGEMENT PROTOCOL

CROSS-REFERENCE TO RELATED APPLICATIONS

This application is a continuation of International Patent Application No. PCT/CN2006/003289, filed Dec. 5, 2006, which claims priority to Chinese Patent Application No. 200610080979.3, filed May 26, 2006, both of which are hereby incorporated by reference in their entirety.

FIELD OF THE INVENTION

The present invention is related to the multicast service, and in particular, to a method, server, and system for optimizing a group management protocol.

BACKGROUND OF THE INVENTION

The Internet Group Management Protocol (IGMP) is designed for Internet Protocol version 4 (IPv4) multicast group management. It runs between a host and a multicast router directly connected to the host. The host tells the multicast router that it wants to join a certain multicast group via the protocol and the router regularly queries whether members of a known group in the local area network (LAN) are active (that is, whether there are still a member of a certain multicast group in the network segment); thus, collecting and maintaining group memberships of the connected network.

IGMP has three versions. IGMPv1 [RFC1112] defines the basic procedures for querying and reporting group memberships. IGMPv2 [RFC2236] is widely used at present, providing a mechanism for fast leave of a group member. IGMPv3 [RFC3376] adds the source filtering function, which enables a group member to designate to receive or not to receive packets from certain multicast sources.

The Multicast Listener Discovery (MLD) protocol is an extension of IGMP for Internet Protocol version 6 (IPv6) applications. MLD realizes the same functions as IGMP. MLD has two versions, MLDv1 and MLDv2, which correspond to IGMPv2 and IGMPv3, respectively.

In IGMPv3 or MLDv2, to support source-specific filtering, the protocol defines two filter modes: INCLUDE and EXCLUDE. In the INCLUDE mode, a multicast receiver receives packets only from specific sources. In the EXCLUDE mode, the receiver receives multicast packets only from resources other than the specific sources. The specific sources are defined in a source list.

The source filtering function defined in IGMPv3/MLDv2 improves the capability of expressing group members. A receiver may choose to receive or not to receive multicast packets from some sources. In IGMPv3, the source filtering function is implemented in a host system as follows:

IPMulticastListen(socket,interface,multicast-address, filter-mode,source-list)     (1)

Socket is a parameter in an IPv4 system and is related to different requesting entities (a certain upper layer protocol or application); interface is a local identifier of the network interface, either physical or logical; multicast-address is the group address of the request; filter-mode is INCLUDE or EXCLUDE; and source-list is a list of unicast IP addresses of multicast sources from which the multicast receiver wants to (in the INCLUDE mode) or does not want to (in the EXCLUDE mode) receive packets.

In MLDv2, there is a similar expression:

IPv6MulticastListen(socket,interface,IPv6multicast-address,filter mode,source list)     (2)

The main difference between (2) and (1) is that the multicast addresses and the source list are represented in the form of IPv6 addresses. For descriptive purposes, the related technical solution herein is described on the basis of IGMPv3. The source filtering function in MLDv2 is equivalent to that in IGMPv3.

IGMP is an asymmetrical protocol, where a group member (normally on a host and occasionally on a router) behaves differently from a multicast router. An IGMPv3 host system stores the multicast group reception state in every socket and every interface so as to support source filtering. The state of a socket is the group reception wishes expressed by every application, that is, the application wishes to join which multicast group and filter which multicast source list at which interface in which filter mode. The group reception state of an interface is a combination of the group reception states of all sockets on the interface. The host may generate an IGMPv3 state report and respond to a request of the connected router for querying group memberships according to the group reception state and state change on the interface.

An IGMPv3-enabled router also needs to store the group reception state of the connected network. The concept model is:

(multicast address,group timer,filter-mode,(source records))     (3)

The multicast address is a group address associated with the state record; the filter-mode is defined by the router, and is recorded as EXCLUDE if the router receives a report that indicates the EXCLUDE mode; the group timer is effective in the EXCLUDE mode, indicating the timeout interval for the filter mode of the group to change from EXCLUDE to INCLUDE; the source record is represented in the form of (source address, source timer); the source address is the address of the multicast source the host wishes to receive packets from; and the source timer defines the timeout interval for receiving packets from the source address.

IGMPv3 and MLDv2 support source filtering, which increases the flexibility of group joining. Especially, the INCLUDE mode is defined to support the Protocol Independent Multicast-Source Specific Multicast routing protocol. However, the adoption of filter modes is also subject to weaknesses:

(1) Complex mode setting and switching: A router has to set and switch the filter mode according to the change of the group reception state of the connected system, and the setting and switching are closely related to the state of the source/group timer and require complex judgment logics. The protocol implementation is inconvenient.

(2) The EXCLUDE mode does not fully meet the requirements of actual applications: On the one hand, it is rare that an application does not want to receive multicast packets from one or more sources in a multicast application system. On the other hand, even if there is a scenario where the host connected to one interface of the router does not want to receive multicast packets from a certain source, it is quite possible that other hosts in the network wish to receive data of this source. In this case, the router must also forward packets from this source. Therefore, the effect of the EXCLUDE mode is limited.

SUMMARY OF THE INVENTION

Embodiments of the present invention provide a method, server, and system for optimizing a group management protocol so as to reduce the complexity in setting and changing filter modes in the prior protocols.

A method for optimizing a group management protocol includes:

sending, by a group member, a membership report to a multicast router;

by the multicast router, judging whether the report carries an EXCLUDE mode non-empty source list upon reception of the membership report; if so, updating a corresponding state inside the router according to a non-source-specific join; or else updating the corresponding state inside the router directly with information of the report if the report does not carry an EXCLUDE mode non-empty source list.

In the foregoing method, the group member sends an INCLUDE mode membership report that carries a non-empty source list to the multicast router to complete a source-specific join; and the multicast router receives a non-source-specific join report and processes the report based on the INCLUDE mode.

Further, the group member sends an INCLUDE mode membership report that carries any source list to the multicast router to complete a non-source-specific join; and the interface model for a non-source-specific join on the group member side indicates inclusion of any source list with "INCLUDE, ANY."

Further, the group member sends an EXCLUDE mode membership report that carries an empty source list to the multicast router to complete a non-source-specific join; and the interface model for a non-source-specific join on the group member side indicates exclusion of an empty source list with "EXCLUDE, NULL."

If the multicast router receives an EXCLUDE mode membership report that carries a non-empty source list, the router processes the report according to reception of an INCLUDE mode membership report that carries any source list or reception of an EXCLUDE mode membership report that carries an empty source list.

A multicast router for collecting and maintaining group memberships includes a judging module, a converting module, and an identifying module;

the judging module is adapted to judge whether a received membership report carries an EXCLUDE mode non-empty source list; if the received membership report carries an EXCLUDE mode non-empty source list, the judging module triggers the converting module; if the received membership report doesn't carry an EXCLUDE mode non-empty source list, the judging module triggers the identifying module;

the converting module is adapted to convert the received membership report into a non-source-specific join report and send the report to the identifying module for processing; and the identifying module is adapted to identify a non-source-specific join report and update a corresponding state inside the router.

The identifying module identifies an INCLUDE mode membership report that carries any source list or an EXCLUDE mode membership report that carries an empty source list as a non-source-specific join report.

The converting module converts an EXCLUDE mode membership report that carries a non-empty source list into a report that can be identified by the identifying module as a non-source-specific join report.

A multicast system for optimizing a group management protocol includes a number of group members and a multicast router adapted to process EXCLUDE and INCLUDE mode membership reports in the INCLUDE filter mode.

The multicast router includes a judging module, a converting module and an identifying module; the judging module is adapted to judge whether a received membership report carries an EXCLUDE mode non-empty source list; if the received membership report carries an EXCLUDE mode non-empty source list, the judging module triggers the converting module; if the received membership report doesn't carry an EXCLUDE mode non-empty source list, the judging module triggers the identifying module; the converting module is adapted to convert the received membership report into a non-source-specific join report and send the report to the identifying module for processing; and the identifying module is adapted to identify a non-source-specific join report and update a corresponding state inside the router.

The identifying module identifies an INCLUDE mode membership report that carries any source list or an EXCLUDE mode membership report that carries an empty source list as a non-source-specific join report.

The converting module converts an EXCLUDE mode membership report that carries a non-empty source list into a report that can be identified by the identifying module as a non-source-specific join report.

Embodiments of the present invention provide the following benefits:

The prior art defines two filter modes and requires the host and the router to maintain complex filter modes and processing mechanisms. In view of the few application scenarios and limited filter effects of the EXCLUDE mode, embodiments of the invention screen the filter function implemented by the prior EXCLUDE mode and upon reception of a membership report, judge whether the membership report carries an EXCLUDE mode non-empty source list; if so, update the corresponding state inside the router according to a non-source-specific join, or else (if the report is an INCLUDE mode membership report carrying an non-empty source list, an INCLUDE mode membership report carrying any source list, or an EXCLUDE mode membership report carrying an empty source list), update the corresponding state inside the router directly with information of the report without the need of mode judgment and switching.

The method provided by an embodiment of the invention can avoid the complex switching and processing of filter modes in the prior protocols.

Upon reception of a membership report, the multicast router judges the filer mode of the report and the attribute of the source list carried in the report instead of rejecting EXCLUDE mode reports carrying a non-empty source list after screening the prior EXCLUDE filter mode. Accordingly, upon reception of such a report, the multicast router updates the corresponding state inside the router according to a non-source specific join; and therefore, the method is compatible with other multicast management protocols of earlier versions.

Embodiments of the invention have reserved the practical INCLUDE mode source filtering function, and therefore can support Source Specific Multicast (SSM).

In support of the method, embodiments of the invention also provide a multicast router and a corresponding multicast system.

DETAILED DESCRIPTION OF THE INVENTION

Figure 1:
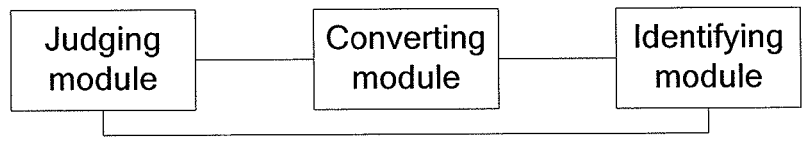
FIG. 1 shows the schematic structure of a multicast router, according to an embodiment of the invention.

To simplify the setting and switching of filter modes in prior protocols (including, but not limited to, IGMPv3 and MLDv2), an embodiment of the present invention provides a multicast router, which implements the collection and maintenance of current group memberships. As shown in FIG. 1, the multicast router includes a judging module, a converting module, and an identifying module that are connected in sequence. The judging module is also directly connected to the identifying module.

The judging module is adapted to judge whether a received membership report carries an EXCLUDE mode non-empty source list; and, if the received membership report carries an EXCLUDE mode non-empty source list, the judging module triggers the converting module; if the received membership report doesn't carry an EXCLUDE mode non-empty source list, the judging module triggers the identifying module.

The converting module is adapted to convert an EXCLUDE mode membership report that carries a non-empty source list into a report that can be identified by the identifying module as a non-source-specific join report and send the report to the identifying module for processing.

The identifying module is adapted to identify a non-source-specific join report and update a corresponding state inside the router. In an embodiment of the invention, the identifying module may identify an INCLUDE mode membership report that carries any source list or an EXCLUDE mode membership report that carries an empty source list as a non-source-specific join report.

Figure 2:
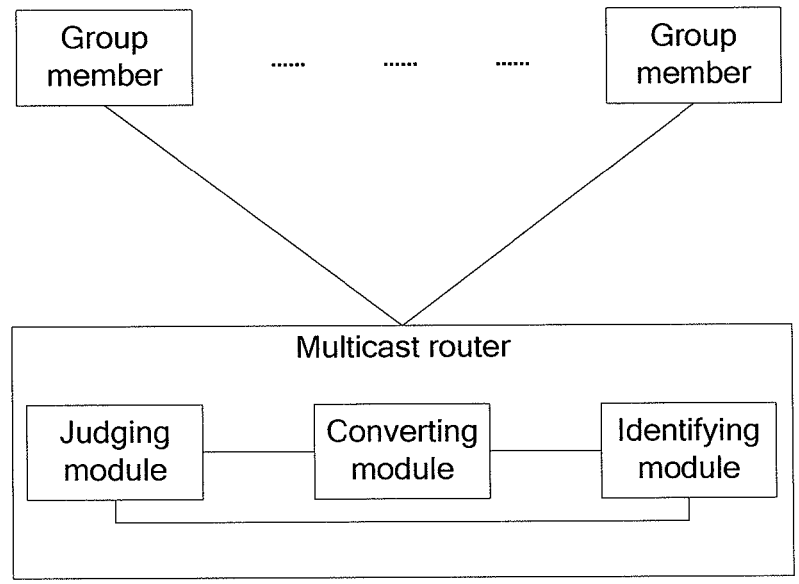
FIG. 2 shows the schematic structure of a multicast system, according to an embodiment of the invention.

In accordance with the foregoing multicast router, an embodiment of the invention provides a multicast system. As shown in FIG. 2, the multicast system includes a multicast router provided by an embodiment of the invention and a number of group members connected to the multicast router.

Figure 3:
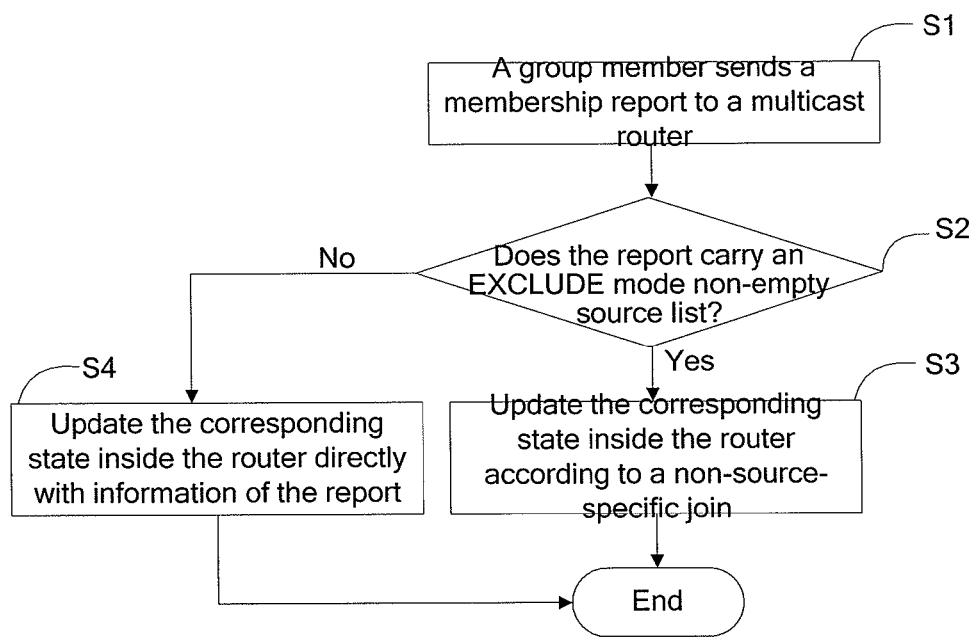
FIG. 3 shows the procedure of a method for optimizing a group management protocol, according to an embodiment of the invention.

With the foregoing multicast router and multicast system, an embodiment of the invention provides a method for optimizing a group management protocol. As shown in FIG. 3, the method includes the following steps:

S1. A group member sends a membership report to the multicast router.

According to the prior art, when a group member starts a multicast application, or when a group member receives a regular query message sent from the multicast router, the group member sends a membership report to the multicast router, reporting the current group reception state of the interface.

To be compatible with protocols of earlier versions, a group member is allowed to send INCLUDE and EXCLUDE mode membership reports to the multicast router.

Further, the INCLUDE mode membership report may be an INCLUDE mode membership report that carries a non-empty source list or an INCLUDE mode membership report that carries any source list. The EXCLUDE mode membership report may be an EXCLUDE mode membership report that carries a non-empty source list or an EXCLUDE mode membership report that carries an empty source list.

S2. Upon reception of the membership report, the multicast router judges whether the membership report carries an EXCLUDE mode non-empty source list; if the received membership report carries an EXCLUDE mode non-empty source list, the procedure proceeds with Step S3; if the received membership report doesn't carry an EXCLUDE mode non-empty source list, the procedure proceeds with Step S4.

Upon reception of the membership report, the multicast router judges the filter mode of the report and the attribute of the source list in the report, and proceeds with Step S3 to screen the EXCLUDE mode to manifest the benefits of the present invention and realize the compatibility with protocols of earlier versions;

Or, the multicast router goes to Step S4 to update the corresponding state inside the router.

S3. Update the corresponding state inside the router, according to a non-source-specific join.

The embodiment of the invention optimizes the prior protocols by screening the EXCLUDE filter mode which has few application scenarios and a low filter efficiency. Upon reception of an EXCLUDE mode report, the router does not set the filer mode or perform switching at timeout. Instead, the router processes an EXCLUDE mode report that carries a non-empty source list as a non-source-specific join report (detailed in Step S4). This means the router updates the corresponding state inside the router according to a non-source-specific join. This avoids mode setting and timeout switching and the router will not return an error message to the group member upon reception of an EXCLUDE report that carries a non-empty source list, thus realizing the compatibility with protocols of earlier versions.

S4. Update the corresponding state inside the multicast router directly with information of the report.

If the multicast router receives an INCLUDE mode membership report that carries a non-empty source list in compliance with the prior protocols; that is, the multicast router receives a source-specific join request of the group member, and the multicast router updates the corresponding state inside the router directly with the non-empty source list, according to the prior procedure.

If the multicast router receives a non-source-specific join report, the router processes the report based on the INCLUDE mode.

The group member may use (INCLUDE, ANY) in the interface model for a non-source-specific join to indicate the inclusion of any source list and send an INCLUDE mode membership report that carries any source list to the multicast router. If the multicast router receives a membership report that carries (INCLUDE, ANY), the router identifies the report as a non-source-specific join report and completes the non-source-specific join.

The group member may use (EXCLUDE, NULL) in the interface model for a non-source-specific join to indicate the exclusion of an empty source list and send an EXCLUDE mode membership report that carries an empty source list to the multicast router. If the multicast router receives a membership report that carries (EXCLUDE, NULL), the router identifies the report as a non-source-specific join report and completes the non-source-specific join.

The above is an overview of the method for optimizing a group management protocol, according to an embodiment of the invention.

The following describes the definitions of related information and specific actions after a prior protocol is optimized, according to the method.

1. Definitions of new interface models for non-source-specific join actions:

IPMulticastListen(socket,interface,multicast-address, INCLUDE,ANY); (4)

In expression (4), IPMulticastListen indicates the IGMPv3 interface model, and may be replaced by IPv6 MulticastListen in the case of MLDv2; socket is a parameter inside the system and is related to different requesting entities; interface is a local identifier of the network interface; multicast-address is a group address of the request; and (INCLUDE, ANY) indicates the join of a non-source-specific group.

IPMulticastListen(socket,interface,multicast-address, EXCLUDE,NULL); (5)

In expression (5), IPMulticastListen indicates the IGMPv3 interface model, and may be replaced by IPv6 MulticastListen in the case of MLDv2; socket is a parameter inside the system and is related to different requesting entities; interface is a local identifier of the network interface; multicast-address is a group address of the request; and (EXCLUDE, NULL) indicates the join of a non-source-specific group.

2. Definitions of mode related fields in a group membership report (INCLUDE and ANY are taken as example; EXCLUDE and NULL may be inferred):

In an IGMPv3/MLDv2 group membership report, there are six types of group records [RFC3376], while four types related to INCLUDE are reserved. The four INCLUDE related types are: NODE_IS_INCLUDE (IS_IN hereinafter), ALLOW_NEW_SOURCES (ALLOW hereinafter), BLOCK_OLD_SOURCES (BLOCK hereinafter), and CHANGE_TO_INCLUDE (TO_IN hereinafter).

3. New definitions of group member behaviors (INCLUDE and ANY are taken as example; EXCLUDE and NULL may be inferred):

a. Change of Host Interface State

In the optimized protocol, the host state change rule is described in Table 1:

TABLE 1

| Old State | New State | Reported State |
|---|---|---|
| INCLUDE (A) | INCLUDE (B) | ALLOW (B − A), BLOCK (A − B) |
| INCLUDE (A) | INCLUDE (ANY) | INCLUDE (ANY) |
| INCLUDE (ANY) | INCLUDE (B) | TO_IN (B) |

When the host generates a report, it encapsulates report types of NODE_IS_INCLUDE, ALLOW_NEW_SOURCES, BLOCK_OLD_SOURCES, and CHANGE_TO_INCLUDE.

b. Actions After the Host Receives a Query Message

In the prior protocol, the host side sets a group timer for response to a source-group query message of a router. When the group timer expires, the host sends a report in response to the query. When the group timer expires, the host needs to compare the source list associated with the group timer and the sources of the associated group of the interface to decide the form of interface state to be reported to the router. In the optimized protocol, the judgment rule is described in Table 2:

TABLE 2

| Interface State | Pending Source List | Responded State Record |
|---|---|---|
| INCLUDE (A) | B | IS_IN (A * B) |
| INCLUDE (ANY) | B | IS_IN (B) |

4. Multicast router behaviors (INCLUDE and ANY are taken as example; EXCLUDE and NULL may be inferred):

a. Filter Mode of the Router

In IGMPv3/MLDv2, the filter mode of an IGMPv3/MLDv2 router is defined to reduce the number of states inside the router. Specifically, upon reception of an EXCLUDE mode message, the filter mode of the router is set to EXCLUDE. If there is no source to EXCLUDE, when the group-timer expires, the filter mode of the router is changed to INCLUDE.

In the optimized protocol, the router does not set or change the filter mode but instead, processes received membership reports only in the INCLUDE filter mode. Therefore, the EXCLUDE mode in the prior router-side protocol is meaningless and the optimized protocol cancels the definition of router mode. The concept model of the reception state of the router is:

multicast address,group timer,(source records) (6)

In expression (6), multicast address is a group address associated with the state record; group timer is adapted to judge whether the network connected with the router has a non-source-specific group reception state; and group records are records of sources.

b. Timer Related Actions:

In the prior protocol, the group timer of an interface is used in the EXCLUDE mode, indicating the timeout interval for the router to change from the EXCLUDE mode to the INCLUDE mode. The router maintains a source timer for each source record.

In the optimized protocol, a group timer is not used to identify the EXCLUDE mode but used to indicate a non-source-specific group. In this case, group timer related behaviors are described in Table 3:

TABLE 3

| Value of Group Timer | Meaning and Action |
|---|---|
| G_Timer > 0 | Indicate that the connected network has a non-source-specific group reception state. |
| G_Timer = = 0 | Indicate that the connected network has no non-source-specific group reception state, where: 1. If a source timer is running in the group, the network still has a source-specific group reception state of the group. 2. If all the source timers in the group expire, the network does not have a source-specific group reception state of the group, and in this case, the group record is deleted. | c. Source-Specific Forwarding Rule

In the optimized protocol, when a multicast router connected to a sub-network receives a multicast packet, the router needs to judge whether to forward the packet to the sub-network, according to information of IGMPv3/MLDv2. The specific judgment rule is described in Table 4:

TABLE 4

| Group Timer | Value of Source Timer | Recommended Action |
|---|---|---|
| G_TIMER = = 0 | S_TIMER > 0 | Forward packets from the source. |
| G_TIMER = = 0 | S_TIMER = = 0 | Stop forwarding packets from the source and delete the source record. If the group has no other source record, delete the entire group record. |
| G_TIMER = = 0 | Empty source list | Do not forward packets from the source. |
| G_TIMER > 0 | S_TIMER > = 0 | Forward packets from the source. |
| G_TIMER > 0 | Empty source list | Forward packets from the source. | d. Reception of a Current-State Membership Report from a Host:

In the prior protocol, upon reception of a Current-state group record, the router needs to update the group timer and the source timer and the filter mode of the router may also change as a result. In the optimized protocol, the actions are described in Table 5:

TABLE 5

| Group Timer | Old Source List | Received Report | New Source List | Action on IGMPv3/MLDv2 |
|---|---|---|---|---|
| G_TIMER = 0 | A | IS_IN(B) | A + B | Set the B timer to GMI/MALI. |
| G_TIMER = 0 | A | IS_EX(NULL) | A | Set the group timer to GMI/MALI. |
| G_TIMER > 0 | A | IS_IN(B) | A + B | Set the B timer to GMI/MALI. |
| G_TIMER > 0 | A | IS_EX(NULL) | A | Set the group timer to GMI/MALI. |

The Group Member Interval (GMI) is the group membership timer defined in IGMPv3; and the Multicast Address Listening Interval (MALI) is the counterpart of GMI in MLDv2.

e. Reception of a Filter-Mode-Change and a Source-List-Change Record:

In the prior art, when a message indicating change of a filter mode or a source list is received, there will be a series of processing and switching actions. In the optimized protocol, a router does not set or change the filter mode, but instead, processes received membership reports in only the INCLUDE mode. This means the router processes only reports of source list change records. The corresponding actions are described in Table 6.

TABLE 6

| Group Timer | Old Source List | Received Report | New Source List | Action on IGMPv3/MLDv2 |
|---|---|---|---|---|
| G_TIMER = 0 | A | ALLOW (B) | A + B | Set the B timer to GMI/MALI. |
| G_TIMER = 0 | A | BLOCK (B) | A | Send a query message: Q (G, A * B). |
| G_TIMER = 0 | A | TO_IN (B) | A + B | Set the B timer to GMI/MALI. Send a query message: Q (G, A − B). |
| G_TIMER > 0 | A | ALLOW (B) | A + B | Set the B timer to GMI/MALI. |
| G_TIMER > 0 | A | BLOCK (B) | A | Send a query message: Q (G, A * B). |
| G_TIMER > 0 | A | TO_IN (B) | A + B | Set the B timer to GMI/MALI. Send a query message: Q (G, A − B). Send a query message: Q (G). |

5. Processing related to compatibility with other versions of IGMP/MLD (INCLUDE and ANY are taken as example; EXCLUDE and NULL may be inferred):

RFC3376 and RFC3810 describe the method for compatibility of IGMPv3/MLDv2 with IGMPv2/IGMPv1/MLDv1. The optimized IGMPv3/MLDv2 and the prior IGMPv3/MLDv2 have the same compatibility rules. However, due to the change of the filter mode, some special processing is adopted.

a. Compatibility with IGMPv1/IGMPv2/MLDv1 as Described in Table 7:

TABLE 7

| Optimized IGMPv3/MLDv2 | IGMPv1 | IGMPv2/MLDv1 |
|---|---|---|
| IS_IN (ALL) | Report | Report |
| TO_IN ({ }) | | Leave/Done |
| IS_IN (A) | Report | Report | a. Compatibility with IGMPv3/MLDv2 as Described in Table 8:

TABLE 8

| IGMPv3/MLDv2 | Optimized IGMPv3/MLDv2 |
|---|---|
| IS_EX ({ }) | IS_EX ({ })/IS_IN (ANY) |
| IS_IN (A) | IS_IN (A) |
| IS_EX (A) | IS_EX ({ })/IS_IN (ANY) |
| TO_IN (A) | TO_IN (A) |
| TO_EX (A) | IS_EX ({ })/IS_IN (ANY) |
| ALLOW (A) | ALLOW (A) |
| BLOCK (A) | BLOCK (A) |

It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for optimizing a group management protocol, comprising:

receiving, by a multicast router, an INCLUDE mode membership report or an EXCLUDE mode membership report from a group member;

judging, by the multicast router, whether the currently received report carries an EXCLUDE mode non-empty source list;

if the currently received report carries the EXCLUDE mode non-empty source list, processing the currently received report carrying the EXCLUDE mode non-empty source list as a non-source-specific join report and completing a non-source-specific join;

if the currently received report does not carry the EXCLUDE mode non-empty source list, updating a corresponding state inside the multicast router directly with information of the currently received report;

receiving, by the multicast router, a non-source-specific join report or a report carrying the EXCLUDE mode non-empty source list, wherein the group member sends an INCLUDE mode membership report that carries any source list to the multicast router to complete a non-source-specific join, or the group member sends an EXCLUDE mode membership report that carries an empty source list to the multicast router to complete a non-source-specific join; and processing, based on an INCLUDE mode, the non-source-specific join report or the report carrying the EXCLUDE mode non-empty source list.

2. The method of claim 1, wherein the group member sends an INCLUDE mode membership report that carries a non-empty source list to the multicast router to complete a source-specific join.

3. The method of claim 1, wherein an interface model for the non-source-specific join on the group member side indicates inclusion of any source list with "INCLUDE, ANY".

4. The method of claim 1, wherein an interface model for a non-source-specific join on the group member side indicates exclusion of the empty source list with "EXCLUDE, NULL".

5. The method of claim 1, wherein, if the multicast router receives an EXCLUDE mode membership report that carries a non-empty source list, the router processes the report according to reception of an INCLUDE mode membership report that carries any source list or reception of an EXCLUDE mode membership report that carries an empty source list.

6. The method of claim 1 wherein, when the group member starts a multicast application, or when the group member receives a regular query message sent from the multicast router, or when the group member changes its receiving state on an interface, the group member sends the membership report to the multicast router, reporting the current group reception state of the interface.

7. A multicast router for collecting and maintaining group memberships, comprising a judging module, a converting module and an identifying module, wherein:
   the judging module is configured to judge whether a currently received INCLUDE or EXCLUDE mode membership report carries an EXCLUDE mode non-empty source list; if the currently received membership report carries the EXCLUDE mode non-empty source list, the judging module triggers the converting module; and if the currently received membership report does not carry the EXCLUDE mode non-empty source list, the judging module triggers the identifying module;
   the converting module is configured to convert the currently received membership report that carries the EXCLUDE mode non-empty source list into a non-source-specific join report and send the non-source-specific join report to the identifying module for processing; and
   the identifying module is configured to identify the non-source-specific join report and complete a non-source-specific join according to the identified non-source-specific join report, wherein the identifying module identifies the INCLUDE mode membership report that carries any source list or the EXCLUDE mode membership report that carries an empty source list as the non-source-specific join report.

8. The route of claim 7, wherein the converting module converts The EXCLUDE mode membership report that carries a non-empty source list into a report that can be identified by the identifying module as the non-source-specific join report.

9. A multicast system for optimizing a group management protocol, comprising a number of group members, and further comprising: a multicast router, configured to process EXCLUDE and INCLUDE mode membership reports in an INCLUDE filter mode, wherein the multicast router comprises a judging module, a converting module and an identifying module, wherein:
   the judging module is configured to judge whether a currently received INCLUDE or EXCLUDE mode membership report carries an EXCLUDE mode non-empty source list; if the currently received report carries an EXCLUDE mode non-empty source list, trigger the converting module, and if the currently received report does not carry the EXCLUDE mode non-empty source list, trigger the identifying module;
   the converting module is configured to convert the currently received membership report into a non-source-specific join report and send the non-source-specific join report to the identifying module for processing; and
   the identifying module is configured to identify the non-source-specific join report and complete a non-specific join according to the identified non-source-specific join report, wherein the identifying module identifies the INCLUDE mode membership report that carries any source list or the EXCLUDE mode membership report that carries an empty source list as the non-source-specific join report.

10. The system of claim 9, wherein the converting module converts an EXCLUDE mode membership report that carries a non-empty source list into a report that can be identified by the identifying module as a non-source-specific join report.

11. The system of claim 9, wherein the converting module converts an EXCLUDE mode membership report that carries a non-empty source list into a report that can be identified by the identifying module as a non-source-specific join report.

* * * * *